(No Model.)
W. A. SPURGEON.
THERMOMETER CASE.
No. 476,571. Patented June 7, 1892.
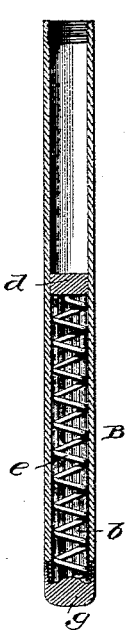
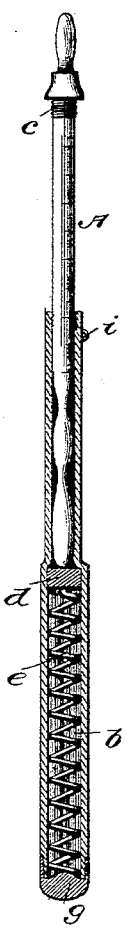
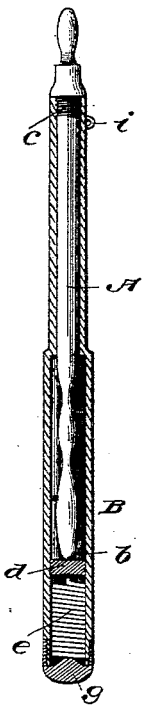
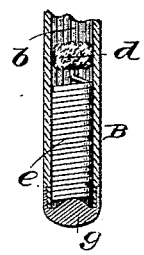
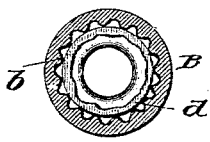
Witnesses
William A. Spurgeon, Inventor
By his Attorney
Franck D. Johns

UNITED STATES PATENT OFFICE.

WILLIAM A. SPURGEON, OF MUNCIE, INDIANA.

THERMOMETER-CASE.

SPECIFICATION forming part of Letters Patent No. 476,571, dated June 7, 1892.

Application filed February 28, 1891. Serial No. 383,229. (No model.)

*To all whom it may concern:*

Be it known that I, WILLIAM A. SPURGEON, a citizen of the United States, residing at Muncie, in the county of Delaware and State of Indiana, have invented certain new and useful Improvements in Thermometer-Cases; and I do hereby declare the following to be a full, clear, and exact description of the invention, such as will enable others skilled in the art to which it appertains to make and use the same.

This invention relates to improvements in physicians' thermometer-cases; and it has for its objects to prevent the transmission of contagious diseases from one person to another in the use of the same. This object I accomplish by means of a peculiarly-constructed case for the thermometer, as more fully hereinafter described.

In the accompanying drawings, Figure 1 represents a side elevation of the thermometer-case; Fig. 2, a longitudinal sectional view of the case with the thermometer partly inserted; Fig. 3, a similar view showing the thermometer fully inserted. Fig. 4 is a cross-section of the enlarged portion of the case, and Fig. 5 is a longitudinal section of a modification of my invention. Fig. 6 is a detail showing the plunger or cork with corrugations in its periphery. Fig. 7 is a further modification of said invention.

Referring to the drawings, the letter A indicates a physician's thermometer of the ordinary description, and B the case thereof. The said case consists of a tube of suitable material, which for about half of its length is of an internal diameter sufficient to permit the thermometer to fit snugly therein. The other portion of the tube is of geater diameter and is corrugated or provided with internal longitudinal grooves *b* for the purpose hereinafter explained. The end of the smaller portion of the tube is internally screw-threaded for the reception of the externally-screw-threaded portion *c* of the thermometer, so as to close the case securely when the thermometer is inserted and holds the thermometer against the outward pressure of the cork and spring hereinafter described.

Within the large portion of the case is located a follower *d*, which is constructed of cork or other material, and behind said follower is located a spiral spring *e*. The said spring is confined in the case by means of a removable cap *g* and keeps the spring normally pressed forward to the shoulder at the junction of the larger and smaller portions of the case. The outer end of the enlarged portion of the casing may be externally screw-threaded for an internally-screw-threaded cap *h*, or said end may be internally screw-threaded for the reception of an externally-screw-threaded plug.

Instead of the corrugations in the enlarged portion of the case, the interior of the case may be made plain and a series of recesses formed at the periphery of the said plunger, or the plunger may be provided with a series of small apertures sufficiently near its edge to be closed by the seat when the follower is in normal position.

The casing at its upper or forward end is provided with a loop *i*, to which is attached one end of a chain or cord *k*, the other end having secured to it a safety-pin *l*, by which it may be attached to the clothing, so that when hanging the casing will be in a vertical position.

In using my improved casing the cork is placed in the rear of the enlarged portion of the tube and pushed up to the shoulder in any convenient manner. The spring is then inserted behind it, and the enlarged portion of the case behind the cork is filled with any suitable antiseptic solution. The cap or plug is then secured, confining the spring and the antiseptic fluid in the rear part of the enlarged portion of the tube. When the thermometer is inserted, the cork is pushed down, compressing the spring and causing the fluid to flow out around the thermometer, thus destroying any disease germs which may adhere to the same. Upon withdrawing the thermometer the follower assumes its normal position closing against its seat, so as to confine the solution in the enlarged portion of the tube while the thermometer is withdrawn.

In Fig. 5 I show a modification of my invention, in which the case is made the same size throughout and the corrugations or longitudinal grooves *b* extend about half its length. When the thermometer is inserted and the cork or follower forced back into the corrugated portion of said case, the fluid escapes around the cork or follower. When the thermometer is withdrawn, the spring forces the cork or follower forward into the smooth portion of the case and the ends of the grooves closing the smooth from the corrugated section of said case, and thus prevents the escape of the fluid.

Having thus described my invention, what I claim, and desire to secure by letters Patent is—

1. A thermometer-case provided with an internal seat about midway between its ends, a follower adapted to close against said seat, and a spring whereby the follower is pressed against the seat, substantially as specified.

2. A thermometer-case consisting of a tube of suitable diameter for about half its length to receive the thermometer, the other portion being enlarged and grooved or corrugated longitudinally, the said portion being provided with a follower, and means for holding the follower normally to its seat, substantially as specified.

3. A thermometer-case provided with an internal seat about midway between its ends, a follower adapted to close against said seat, a spring adapted to press said follower against said seat, and a removable cap pressing said follower against its seat and closing the lower end of the thermometer-case, substantially as shown and described.

4. The combination, with a thermometer-case having longitudinal grooves or corrugations extending about half the length of the case, of a follower mounted in said case, and a spring actuating the same, substantially as specified, for the purpose set forth.

5. A thermometer-case consisting of a hollow tube closed at one end and adapted to contain an antiseptic fluid, and a porous spring-actuated follower located within said tube and adapted to retain the antiseptic fluid within the case when the thermometer is withdrawn and to permit said fluid to pass through said follower and surround the thermometer when the same is inserted and the follower-spring compressed, substantially as shown and described.

6. The combination, with the thermometer-case closed at one end and provided at its open end with a screw-thread and a porous spring-actuated follower located in said case, of a thermometer adapted to enter the case, and a cap engaging the screw-thread and adapted to force the thermometer against the follower and hold the same against the tension of the spring, substantially as shown and described.

In testimony whereof I affix my signature in presence of two witnesses.

WILLIAM A. SPURGEON.

Witnesses:
LEVINGSTON A. KIRKWOOD,
ALVA WINDSOR.